(12) United States Patent
De Nora (10) Patent No.: US 10,865,913 B2
(45) Date of Patent: Dec. 15, 2020

(54) FLEXIBLE HOSE (71) Applicant: EUROEQUIPE S.R.L., Valsamoggia (IT)

(72) Inventor: Paolo De Nora, Casalecchio di Reno (IT)

(73) Assignee: EUROEQUIPE S.R.L., Valsamoggia (IT)

( * ) Notice: Subject to any disclaimer, the term of this patent is extended or adjusted under 35 U.S.C. 154(b) by 0 days.

(21) Appl. No.: 15/762,285

(22) PCT Filed: Oct. 28, 2016

(86) PCT No.: PCT/IB2016/056528
§ 371 (c)(1),
(2) Date: Mar. 22, 2018

(87) PCT Pub. No.: WO2017/072729
PCT Pub. Date: May 4, 2017

(65) Prior Publication Data
US 2018/0283585 A1    Oct. 4, 2018

(30) Foreign Application Priority Data

Oct. 30, 2015 (IT) .......................... 102015000067141

(51) Int. Cl.
*F16L 11/112* (2006.01)
*B29C 48/10* (2019.01)
(Continued)

(52) U.S. Cl.
CPC ......... *F16L 11/112* (2013.01); *B29C 48/0019* (2019.02); *B29C 48/10* (2019.02);
(Continued)

(58) Field of Classification Search
CPC .......... F16L 11/112; F16L 11/08; F16L 11/11; F16L 11/115; B29C 8/10; B29C 8/21;
(Continued)

(56) References Cited

U.S. PATENT DOCUMENTS 3,330,303 A * 7/1967 Fochler ................ H01B 7/1875
138/120
4,136,149 A   1/1979 Payne
(Continued)

FOREIGN PATENT DOCUMENTS

EP     0793045 A1   9/1997
GB     1506776 A    4/1978
(Continued)

OTHER PUBLICATIONS

International Search Report and Written Opinion dated Jan. 30, 2017 for counterpart PCT Application No. PCT/IB2016/056528.
(Continued)

*Primary Examiner* — Craig M Schneider
*Assistant Examiner* — David R Deal
(74) *Attorney, Agent, or Firm* — Shuttleworth & Ingersoll, PLC; Timothy J. Klima (57) ABSTRACT

A flexible hose including a first tubular element of corrugated shape having in longitudinal cross-section a series of outer crests and a second tubular element of lightweight polymeric material externally associated with said first tubular element so as to fill at least partially a corresponding series of troughs alternately shaped by said outer crests.

9 Claims, 5 Drawing Sheets (51) Int. Cl.
  *B29C 48/00* (2019.01)
  *B29C 48/21* (2019.01)
  *F16L 11/115* (2006.01)
  *F16L 11/08* (2006.01)
  *F16L 11/11* (2006.01)
  *B29C 53/30* (2006.01)
  *B32B 1/08* (2006.01)
  *B32B 3/28* (2006.01)
  *B32B 27/08* (2006.01)

(52) U.S. Cl.
  CPC .............. *B29C 48/21* (2019.02); *B29C 53/30* (2013.01); *B32B 1/08* (2013.01); *B32B 3/28* (2013.01); *B32B 27/08* (2013.01); *F16L 11/08* (2013.01); *F16L 11/11* (2013.01); *F16L 11/115* (2013.01); *B32B 2597/00* (2013.01)

(58) Field of Classification Search
  CPC ......... B29C 8/0019; B29C 53/30; B32B 1/08; B32B 3/28; B32B 27/08; B32B 597/00
  See application file for complete search history.

(56) References Cited

U.S. PATENT DOCUMENTS

| | | | | |
|---|---|---|---|---|
| 5,037,143 A | * | 8/1991 | Sanders | F16L 25/0036 138/121 |
| 5,058,934 A | | 10/1991 | Brannon | |
| 5,129,428 A | * | 7/1992 | Winter | B29D 23/001 138/104 |
| 5,145,545 A | * | 9/1992 | Winter | B29D 23/001 156/244.13 |
| 5,256,233 A | * | 10/1993 | Winter | B29D 23/001 156/244.13 |
| 5,398,977 A | * | 3/1995 | Berger | F16L 11/20 141/44 |
| 5,485,870 A | * | 1/1996 | Kraik | B21F 17/00 138/121 |
| 6,000,434 A | | 12/1999 | Winter et al. | |
| 6,041,824 A | * | 3/2000 | Powell | B29C 45/14598 138/109 |
| 6,983,769 B2 | | 1/2006 | Arima et al. | |
| 7,156,128 B1 | * | 1/2007 | Kanao | F16L 11/112 138/122 |
| 7,398,798 B2 | * | 7/2008 | Ostan | F16L 11/15 138/114 |
| 8,734,931 B2 | * | 5/2014 | Seth | B32B 5/022 428/172 |

FOREIGN PATENT DOCUMENTS

| | | |
|---|---|---|
| JP | 2000028082 A | 1/2000 |
| WO | WO2004039574 A2 | 5/2004 |

OTHER PUBLICATIONS

European Office Action dated Feb. 17, 2020 for counterpart European Patent Application No. EP16815636.2.
Chinese Office Action dated Dec. 24, 2019 for counterpart Chinese Patent Application No. CN201680062010.5.
Indian Office Action dated Jul. 27, 2020 from counterpart Indian Patent Application No. 201827011424.

* cited by examiner

FLEXIBLE HOSE

This application is the National Phase of International Application PCT/IB2016/056528 filed Oct. 28, 2016 which designated the U.S.

This application claims priority to Italian Patent Application No. 102015000067141 filed Oct. 30, 2015, which application is incorporated by reference herein.

TECHNICAL FIELD

The present invention concerns a flexible hose. More in particular, the present invention concerns a flexible hose preferably, but not exclusively, for use in activities such as gardening and the like.

BACKGROUND ART

In various fields, and more specifically in the gardening and the like, it is widespread the use of flexible hoses which combine a good performance with a relatively low cost. Over time, this type of hoses has gradually evolved to get the best performances under different conditions of use. In particular, to obtain a better quality, hoses comprising more layers have been devised, each of which is intended to have a specific function, for example the function of outer coating, or of direct contacting with the fluid or of barrier against the growth of algae or other similar organisms.

To improve in particular the mechanical properties, such as resistance to the fluid pressure, torsion, crushing, perforation by external bodies and others, different reinforced flexible hoses have been devised, in which at least one of the layers specifically has such function of mechanical resistance, while maintaining a good flexibility.

The reinforcement layer can be constituted for example by a net or a fabric of polymeric material that wraps an underlying layer of the hose, and on which an additional external protective layer is optionally applied.

In fields different from gardening, such as for example plant engineering, it is known the use of multi-layer flexible hoses capable of withstanding very high pressures. Patent application GB 1506776 describes, for example, a flexible hose comprising an inner layer of corrugated thermoplastic material; a layer of deformable material that covers the inner corrugated layer; and an outer reinforcement layer of textile knitting or metal net placed in contact with the coating layer. The inner corrugated layer externally defines annular cavities with a substantially trapezoidal profile, which are filled by said layer of deformable material.

Flexible hoses of substantially the same type are illustrated in patent applications EP 0793045 and WO 2004/039574.

The presence of a plurality of layers generally results in an increase of the weight per linear meter of the known flexible hoses. This fact can be particularly disadvantageous both from the point of view of the use of the product, and from the point of view of the transport or storage. As a matter of facts, it should be noted that hoses of this type can also reach some tens of meters in length; consequently, the weight of a single hose can be high and thus difficult for the user to move easily.

The high weight of the hose obviously significantly affects also on transportation costs.

It is also complained that reinforced hoses of this kind can have a relatively high cost.

DISCLOSURE OF THE INVENTION

The task of the present invention is to solve the aforementioned problems, devising a flexible hose having great lightness.

Within such technical task, it is a further scope of the present invention to provide a hose with great flexibility.

Another scope of the invention is to provide a flexible hose of simple constructive and functional conception, provided with surely reliable functioning, versatile use and relatively economic cost.

The cited scoped are reached by a flexible hose according to the present disclosure.

According to the invention, the flexible hose comprises a first tubular element of corrugated shape having in longitudinal cross-section a series of outer crests having triangular profile, so as to be axially flexible, and a second tubular element of lightweight material externally associated with said first tubular element so as to fill at least partially a corresponding series of troughs alternately shaped by said outer crests.

Said first tubular element of corrugated shape shapes a sort of bellow.

Advantageously, said outer crests of said first tubular element have a scalene triangle shape.

Preferably, the pitch of said outer crests is equal to about one-third of the internal diameter of the hose.

Advantageously, said lightweight polymeric material of said second tubular element partially fills said series of troughs alternately shaped between said outer crests, so as to define on the bottom of said troughs a corresponding series of chambers of annular shape.

Preferably, said chambers of annular shape are obtained in sealing between said first tubular element and said second tubular element.

Preferably, said first tubular element is made of substantially rigid polymeric material.

According to an embodiment of the invention, said first tubular element is made of a material of the type of PVC, PU, PET and the like, or by a mixture of the aforementioned materials.

Preferably, said second tubular element is made of a lightweight material selected among a polymeric material, a foam material, a vulcanized and/or low-density rubber, or a mixture of the aforementioned materials.

Advantageously, said second tubular element is externally associated with said first tubular element through co-extrusion.

Preferably, said outer crests of said first tubular element have, in extended configuration, a pitch of approximately one-third of the internal diameter of the same first tubular element.

According to an embodiment of the invention, said outer crests of said first tubular element have respective cavities aligned so as to define at least one groove longitudinal to said first tubular element.

Preferably, in said longitudinal groove is housed a filiform reinforcement element predisposed to be embedded in said lightweight polymeric material of said second tubular element.

According to an embodiment of the invention, the flexible hose comprises an external coating layer overlapped to said second tubular element.

According to an embodiment of the invention, the flexible hose comprises a third tubular element of flexible material internally associated to said first tubular element so as to fill at least partially a corresponding series of troughs alternately shaped by the inner crests of said first tubular element.

According to an embodiment of the invention, the flexible hose comprises an internal coating layer inserted inside said third tubular element.

The present invention concerns as well a method for manufacturing a flexible hose which provides to form, through extrusion and subsequent corrugation, a first tubular element of corrugated shape having in longitudinal cross-section a series of outer crests with triangular profile; arranging, through a compacting device, said first tubular element in a compacted configuration; associating a second tubular element of lightweight material externally to said first compacted tubular element, through co-extrusion, so as to fill at least partially a corresponding series of troughs alternately shaped by said outer crests.

Advantageously, said co-extrusion step of the second tubular element on the first compacted tubular element occurs in absence of air through the depression created by a vacuum pump working at the extrusion head.

Advantageously, said depression created by the vacuum pump is predisposed to modulate the thickness of the coating of said second tubular element of lightweight material on said first tubular element.

Advantageously, said depression created by the vacuum pump is predisposed to modulate the filling of said troughs with said second tubular element of lightweight material.

Advantageously, the method provides to cool the hose obtained from said co-extrusion step.

Advantageously, the method provides to perform the drawing of said hose at one end thereof so as to obtain the calibrated releasing of said compacted first tubular element.

Preferably, said compacting device performs a reduction of the line feeding speed of said first tubular element to a value equal to about one-third of the speed of entry inside the same compacting device, so as to cause a reduction of the pitch of said outer crests.

BRIEF DESCRIPTION OF DRAWINGS

Details of the invention shall be more apparent from the detailed description of a preferred embodiment of the flexile hose according to the invention, illustrated for indicative purpose in the attached drawings, wherein.

DETAILED DESCRIPTION OF PREFERRED EMBODIMENTS OF THE INVENTION

With particular reference to such figures, the flexible hose according to the present invention is indicated in its entirety with 1. Advantageously, the flexible hose according to the invention is intended for use in the gardening field and the like. However, it is possible to intend its use also for other fields.

Figure 1:
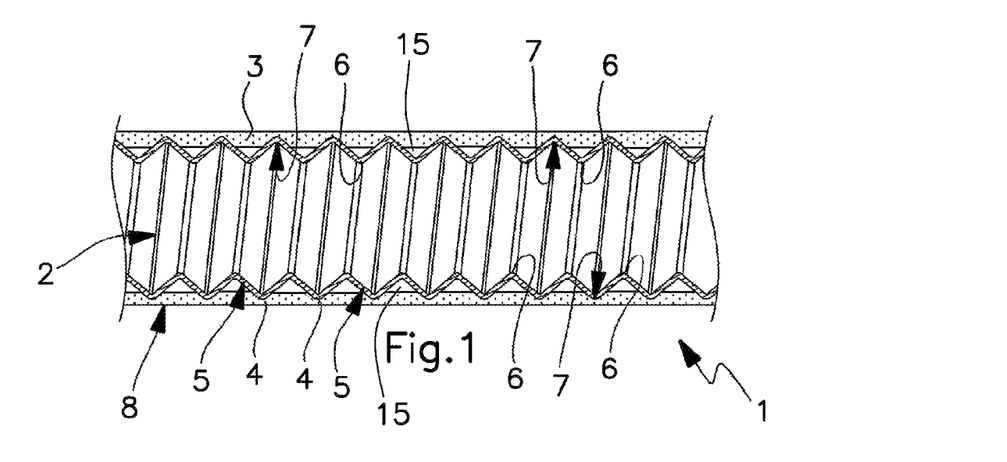
FIG. 1 shows a longitudinal cross-sectional view of a portion of the flexible hose according to the invention.

The flexible hose 1 comprises a first flexible tubular element 2 of a corrugated type. The first tubular element 2 can be manufactured through a polymeric material of suitable mechanical properties, for example PVC, PU, PET and the like, or a mixture of the same materials. The first tubular element 2 can also be manufactured by co-extrusion, in more layers and with different materials.

Moreover, the flexible hose 1 comprises a second flexible tubular element 3. The second tubular element 3 is associated externally with the first tubular element 2. Preferably, the second tubular element 3 is manufactured with a lightweight material selected among a polymeric material, a foam material, a vulcanized and/or low-density rubber, or a mixture of the same materials. For example, the second tubular element 3 is made of thermoplastic polymeric material with low density, with a foaming agent, or vulcanized and/or low-density rubber with foaming agent. The foaming agent con be of any type, and for example in liquid or paste form, or with grains, powder and so on.

The foaming agent, during the expansion step, generates gases that spread within the polymeric matrix, forming a cell structure within the polymeric material. Such cell structure allows to obtain, for equal volume, a considerable lightening of the material. Furthermore, the formation of such a cell structure gives the material of the second tubular element 3 a substantially spongy or however widely porous consistency, characterized by a certain elasticity.

The first corrugated tubular element 2 has in longitudinal cross-section a series of outer crests 4, having triangular profile, and a corresponding series of troughs 5 alternately shaped by said outer crests 4. The crests 4 and the troughs 5 give rise, at the inner side of the first corrugated tubular element 2, to a plurality of specular crests 6 and troughs 7. In substance, the outer crests 4 and the outer troughs 5 respectively correspond to the inner crests 6 and the inner troughs 7 of the first tubular element 2, so as to define a sort of bellows.

Advantageously, according to the present invention, the crests 4 and 6 of the first tubular element 2, respectively outer and inner, have a scalene triangle profile.

According to an aspect of the invention, the second tubular element 3 is associated with the first tubular element 2 so that the lightweight material fills at least partially the outer troughs 5 of the first tubular element 2.

According to an embodiment of the invention, the second tubular element 3 is associated with the first tubular element 2 so that the lightweight material fills completely, and in uniform manner, the outer troughs 5 of the first tubular element 2. This allows to obtain an extended superficial adhesion between the two components that eliminates any detachments risk during use.

According to a different embodiment of the invention, the second tubular element 3 is associated with the first tubular element 2 so as to partially fill the troughs 5 alternately shaped by said outer crests 4, so as to define at the bottom of the same troughs 5 a corresponding series of chambers 15 of annular shape. The chambers 15 of annular shape are obtained in sealing between the first tubular element 2 and the second tubular element 3.

According to a further aspect of the invention, the second tubular element 3 has a smooth or substantially smooth external surface 8. Therefore, the second tubular element 3 has a non-uniform outer thickness, and then does not follow the shape of the inner corrugated tubular element 2. The smooth or substantially smooth outer surface 8 of the second tubular element 3 prevents the hose 1 to collect dirt during use. However, it is not excluded that the outer surface 8 of the second tubular element 3 may have non-smooth shape.

Figure 7:
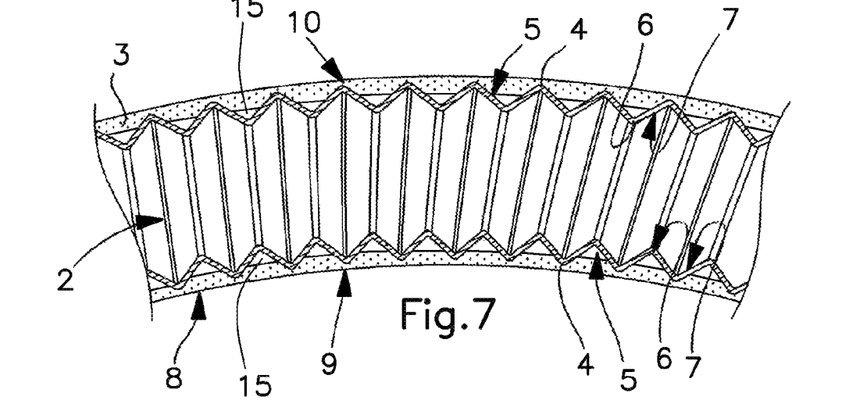
FIGS. 7 and 8 respectively show the longitudinal cross-section of the flexible hose illustrated in FIGS. 1 and 2 in a curved configuration.
Figure 7A:
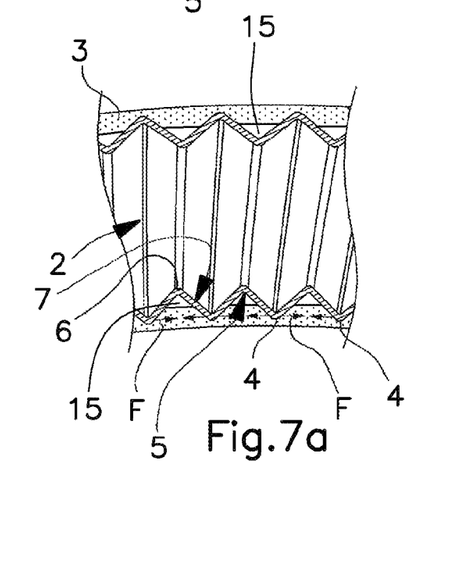
FIGS. 7a and 8a show a magnified detail respectively of FIGS. 7 and 8.

As it can be seen in FIG. 7, in use, the flexible hose 1 can assume a curved configuration with respect of the longitudinal axis of the same hose. In such configuration, the second tubular element 3 shortens, that is, is compressed, from the inner side 9 of the hose with respect to the centre of curvature, while it extends, that is, is stretched at the outer side 10 with respect to the above-mentioned centre of curvature. In particular, the portions of material which fill the outer troughs 5 are compressed by the same outer crests 4 of the first tubular element 2 which approach each other, as it is schematically indicated with arrows F in the detail of FIG. 7A. Such portions of material which fill the outer troughs 5, due to their spongy or porous consistency having a certain elasticity, locally exert a damping action during the folding of the hose.

In addition to that, the material of the second tubular element 3 exerts an effective protective action of the first tubular element 2, which is the bearing core of the flexible hose 1, and thus also a protective action of the fluid flowing therein. Such protective action exerted by the second tubular element 3 is firstly evident with regard to mechanical stresses, such as impacts, compressions, perforations by external bodies and the like. Furthermore, the second tubular element 3 exerts a protective action on the first tubular element 2, and thus on the fluid flowing therein, against external agents such as sunlight and the like.

The second tubular element 3, when made of a material of suitable characteristics, can also be predisposed to ensure a certain thermal insulation of the fluid flowing inside the first tubular element 2.

The flexible hose 1, in use, may be longer than the length that it has at rest. In particular, the flexible hose 1, due to the pressure of the fluid that flows therein, can expand both axially and radially, thanks to the geometrical and mechanical characteristics of the first tubular element 2 and of the second tubular element 3. A suitable choice of the corrugated profile of the first tubular element 2, as well as the specific materials for manufacturing the first tubular element 2 and the second tubular element 3, may allow to obtain different percentages of stretching of the hose when traversed by the fluid. In practice, this stretching can reach about 20-30%.

Figure 10:
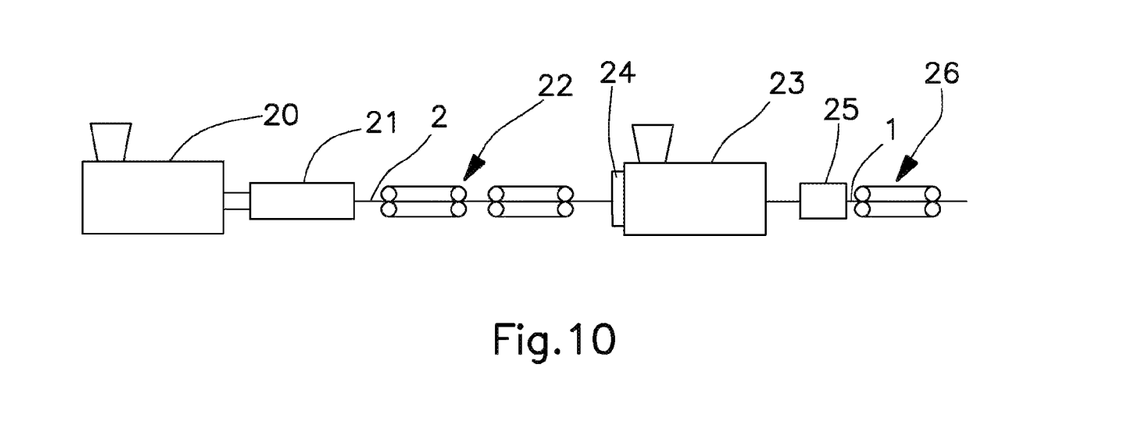
FIG. 10 shows a schematic view of a production line of the flexible hose according to the invention.

The method for manufacturing the described flexible hose provides, first, to form through an extrusion device 20 and a subsequent corrugation device 21, known per se, the first tubular element of corrugated shape having in longitudinal cross-section a series of outer crests 4 having triangular profile (see FIG. 10).

Then, said first tubular element 2 is arranged in a compacted configuration through a compacting device 22. This is obtained in particular by reducing the feeding speed of the first tubular element 2 along the feeding line, for example from a 20 m/min speed at the entry zone of the compactor 22 to a 7 m/min speed at the exit. In the compacted configuration, the cusps of the crests 4 are obviously close, that is the pitch between one another is reduced. More generally, the exit speed of the first tubular element 2 of the compactor 22 is suitably equal to about one-third of the exit speed from the corrugation device 21.

Subsequently, the second tubular element 3 of lightweight material is externally associated with the first compacted tubular element 2, through a co-extrusion device 23, so as to fill at least partially a corresponding series of troughs 5 alternately shaped by the above mentioned outer crests 4.

Advantageously, the co-extrusion step of the second tubular element 3 on the first compacted tubular element 2 occurs in the absence of air through the depression created by a vacuum pump 24 acting at the extrusion head of said co-extrusion device 23. Such depression created by the vacuum pump is predisposed to modulate the thickness of the coating of said second tubular element 3 of lightweight material on said first tubular element 2.

In the co-extrusion step of the second tubular element 3 on the first tubular element 2, it is possible to also perform the expansion step of the foaming agent possibly present. In relation to the type of the used foaming agent, if for example of the exothermic or endothermic type, it is possible to optimize the co-extrusion step of the second tubular element 3 compatibly with the type of expansion reaction which must take place within the material that composes it. For example, in the case in which an endothermic foaming agent is used, an adequate transfer of thermal energy from the extrusion device to the material to be extruded is required.

At the exit from the co-extrusion device 23, the hose 1, obtained through the co-extrusion step, is cooled inside a cooling device 25.

Finally, the drawing of the hose 1 at one end thereof, by the drawing device 26, is performed so as to obtain the calibrated releasing of the first compacted tubular element 2. This is obtained, in particular, by increasing the line feeding speed in line of the hose, for example from the previous 7 m/min speed to a 15 m/min speed.

Suitably, the cited working steps are performed in sequence with the help of a calibrated rod longitudinally inserted inside the first tubular element 2.

Figure 2:
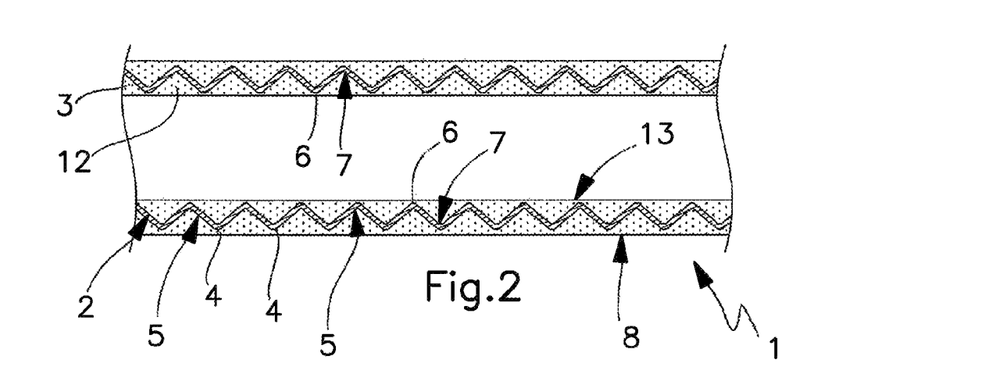
FIGS. 2, 3, 4, 5 and 6 respectively show an equivalent cross-sectional view of other embodiments of the flexible hose according to the invention.

In FIG. 2 a different embodiment of the flexible hose according to the invention is shown, comprising a third flexible tubular element 12, associated internally with the first tubular element 2.

The third tubular element 12 is made of a lightweight material selected among a polymeric material, a vulcanized and/or low-density rubber, a foam material, or a mixture of the aforesaid materials. In particular, the material composing the third tubular element 12 can be the same of the second tubular element 3 or a different material, for example a different combination of a polymeric material and a foaming agent.

Like the second outer tubular element 3, the third inner tubular element 12 is associated with the first tubular element 2 so that the lightweight material fills at least partially the inner troughs 7 of the first tubular elements 2. Preferably, the inner surface 13 of the third tubular element 12 is substantially smooth. In this way, it is possible to prevent any entrapments of liquid at the inner troughs 7 of the first tubular element 2.

Figure 8:
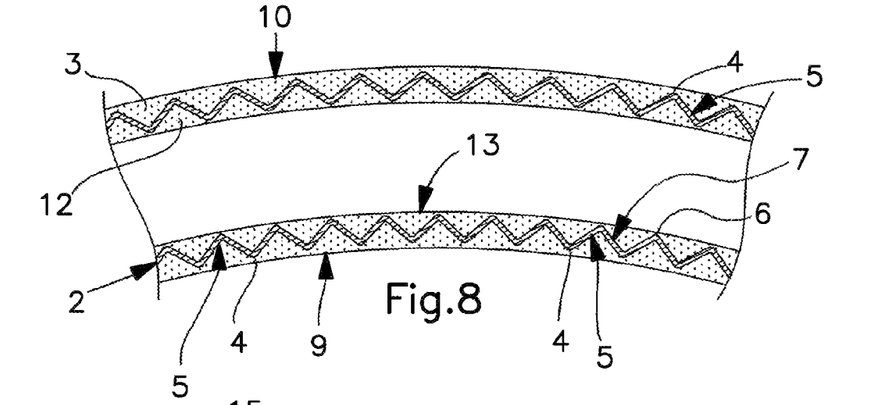
Figure 8A:
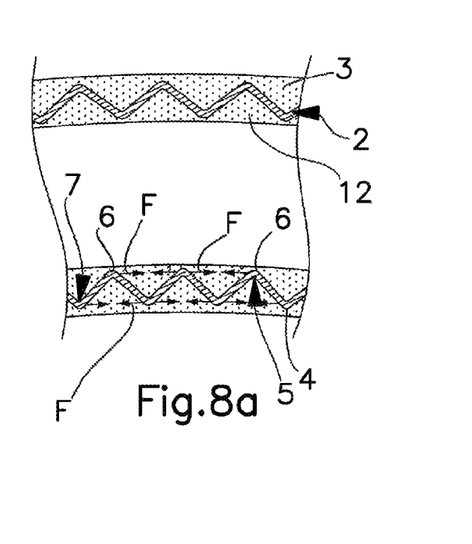

In this case the mutual approaching of the crests 4 and 6, respectively outer and inner, of the first tubular element 2 determines the compression of the corresponding portions of material of the second tubular element 3 and of the third tubular element 12, that respectively fill the outer troughs 5 and the inner troughs 7, as it is schematically indicated with arrows F (see FIGS. 8 and 8*a*).

In the manufacturing step, the extrusion of the third tubular element 12 can be performed simultaneously to the extrusion of the second tubular element 3, for example, by using the same extrusion device. It can be useful, additionally, to use the same materials for manufacturing the second tubular element 3 and the third tubular element 12.

Figure 3:
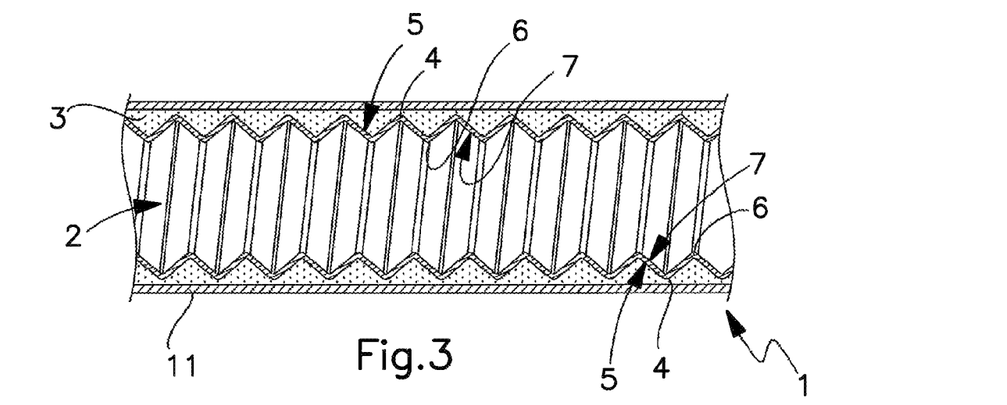

In FIG. 3 a further embodiment of the flexible hose according to the invention is shown, comprising at least one external coating layer 11 overlapped to the second tubular element 3. The external coating layer 11 can be preferably cylindrical and smooth, in particular when the outer surface 8 of the second tubular element 3 is smooth.

The external coating layer 11 of the second tubular element 3 has mainly protective function of the underlying lightweight material composing the second tubular element 3, for example to increase its resistance to abrasion or to perforation by external bodies, as well as to function as a barrier against the external agents such as sunlight or as heat insulator. The external coating layer 11 can be made of any material having suitable properties, for example a polymeric material, or layers of different materials.

Figure 4:
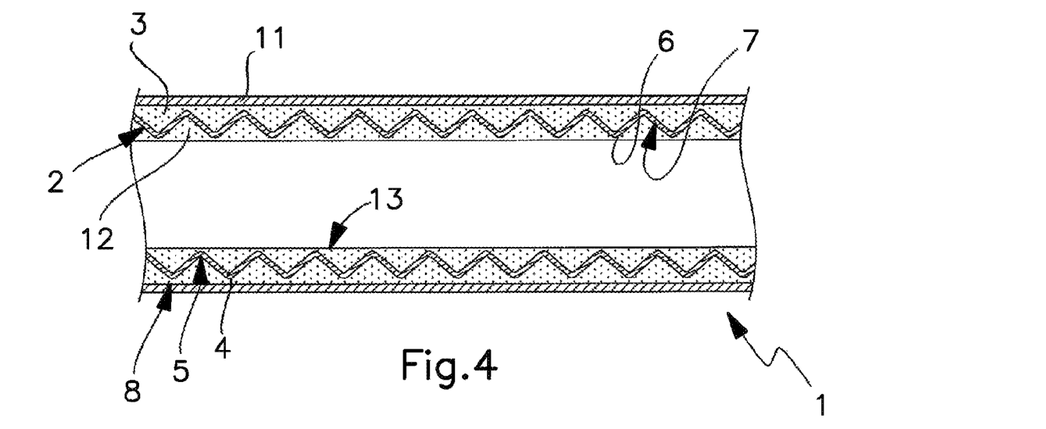

In FIG. 4 a further embodiment of the flexible hose according to the invention is shown, comprising, in addition to the first tubular element 2 and to the second tubular element 3, also a third inner tubular element 12 and an external coating layer 11, according to the preceding description.

Figure 5:
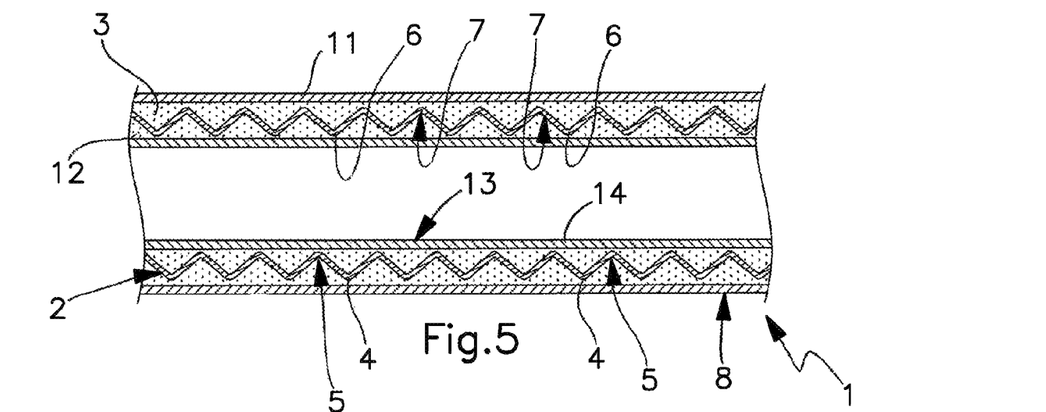

In FIG. 5, a further embodiment of the flexible hose according to the invention is shown, being different from the previous one for the presence of an additional internal coating layer 14, inserted inside the third tubular element 12 intended for the direct contact with the fluid which traverses the flexible hose. Obviously, also the internal coating layer 14 can be made of any material having suitable properties, for example a polymeric material, or layers of different materials.

Figure 6:
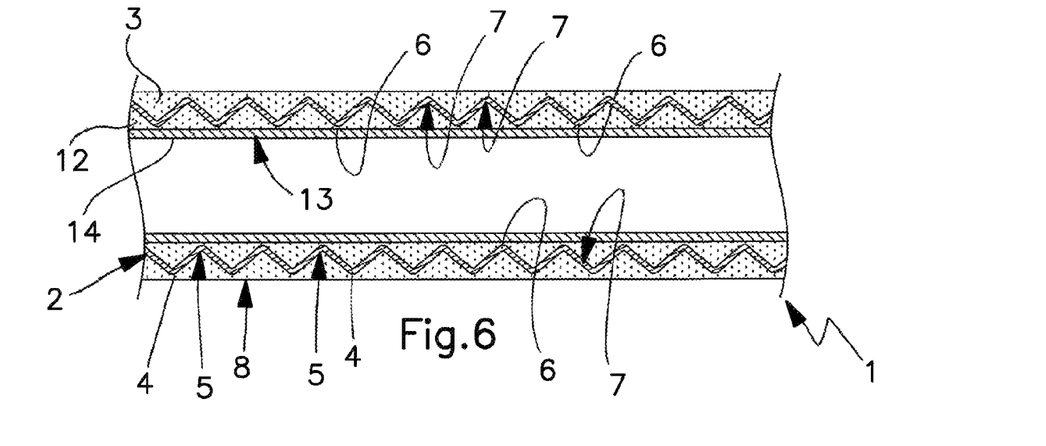

In FIG. 6 a further embodiment of the flexible hose according to the invention is shown being different from the previous one for the absence of an external coating layer 11. Therefore, this is, in substance, a simplified version compared to the previous one.

Figure 9:
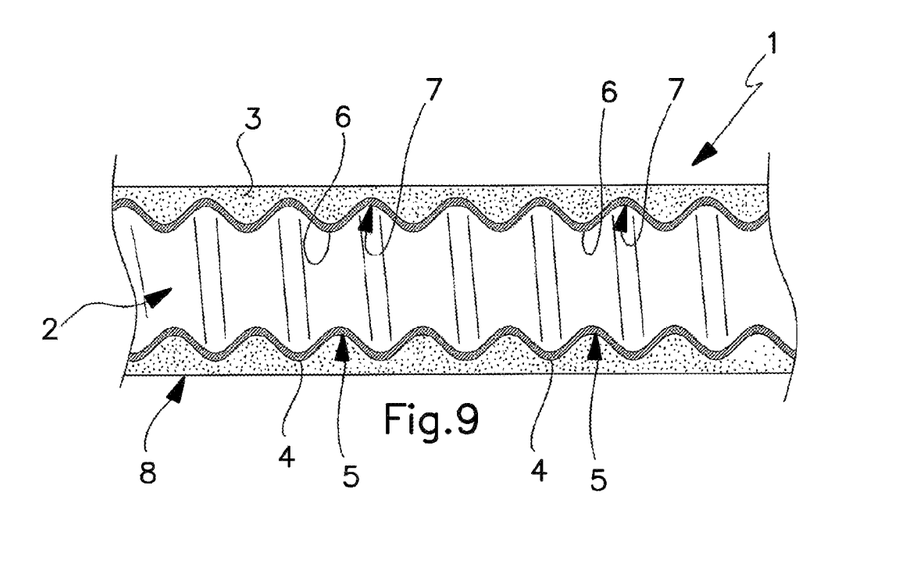
FIG. 9 shows a longitudinal cross-sectional view of a further embodiment of the flexible hose according to the invention.

In FIG. 9 a further embodiment of the flexible hose according to the invention in shown, in which the cusps of the crests 4 and 6, outer and inner, of the first tubular element 2 are rounded so as to give the corrugated profile a substantially sinusoidal shape. This allows to improve the adhesion between the first tubular element 2 and the second tubular element 3, because any concentrations of tension in the coupling between the respective materials are eliminated. Obviously, such a conformation of the corrugated of this type can be provided also for the embodiments of the flexible hose illustrated in FIGS. 2 to 8.

The flexible hose according to the invention therefore reaches the scope of combining the features of great lightness and flexibility. This result is achieved thanks to the inventive idea of associating, preferably by co-extrusion, a first tubular element having a corrugated shape having in longitudinal cross-section a series of outer crests with a triangular profile and a second tubular element of polymeric lightweight material predisposed to fill at least partially the corresponding series of troughs defined by the outer crests.

A prerogative of the flexible hose according to the present invention is that the conformation of the outer crests of the tubular corrugated element with triangular profile, in particular of scalene triangle, allows to obtain a very high flexibility of the hose, that is, a very small radius of curvature, without the occurrence of occlusions of the hose. In practice, the hose folding angle can reach an amplitude of 360°, that is, the folding of the tube is possible on itself by ensuring the flow of the fluid in its interior. In particular, the continuity of the flow is also ensured in the case of hose knotting.

Another advantage offered by the hose according to the invention is given by the fact of avoiding the closure of the fluid passage even in the presence of lateral torsion and the like, which are frequent in the use of this type of hoses.

Figure 11:
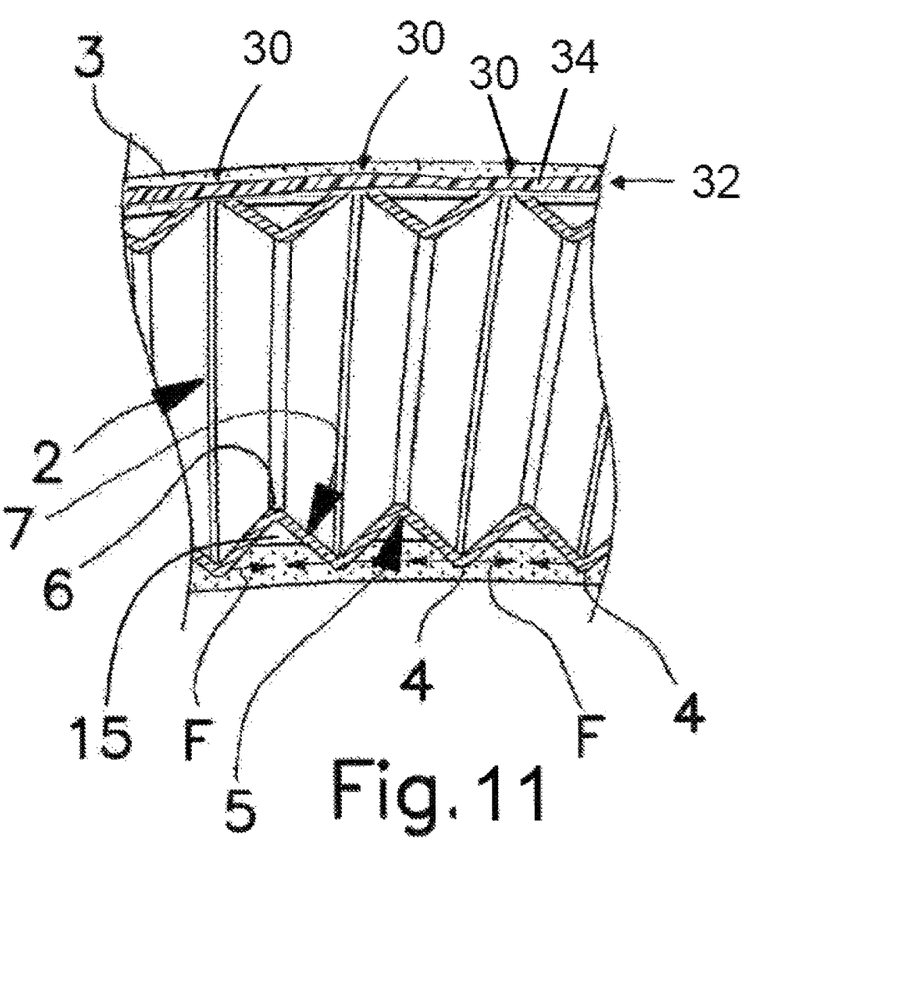
FIG. 11 shows a schematic detial of an embodiments including a reinforcing thread.

The flexible hose described by way of example is susceptible of numerous modifications and variants according to the different needs. For example, it is possible to provide that the outer crests 4 of the first tubular element 2 have respective radial recesses 30, for example in diametrically opposite positions, aligned so as to define at least one groove 32 longitudinal to the same first tubular element. See FIG. 11. Usefully, in such longitudinal groove is housed a reinforcement thread-like element 34 predisposed to be embedded in the lightweight polymeric material of the second tubular element 3.

Furthermore, the second tubular element 3 and/or the third tubular element 12, if made at least partially of a foam material, can be manufactured so as to have a cell structure having different characteristics in relation to the different areas of the flexible hose. For example, the porous or spongy consistency of the second tubular element 3 and/or of the third tubular element 12 could be more accentuated near the surface of the first tubular element 2 and less accentuated towards the outside, or vice versa. In this way, it is possible to obtain different mechanical behaviors of the flexible hose in relation to the different areas of its thickness, for example greater or lesser yielding in the folded configuration, greater or lesser resistance to external agents and the like.

In practice, the used materials as well as the size and shape may vary according to the Should the technical characteristics mentioned in the claims be followed by reference signs, such reference signs were included for the sole purpose of increasing the understanding of the claims and thus they shall not be deemed limiting the scope of the element identified by such reference signs by way of example.

The invention claimed is:

1. A flexible hose for gardening, comprising:
   a first tubular element of rigid polymeric material having corrugated shape and having in longitudinal cross-section a series of outer crests having a triangular profile, to be axially flexible, the first tubular element including a radially exterior surface and a radially interior surface, the radially interior surface defining a flow path for fluid through the flexible hose,
   a second tubular element of lightweight polymeric material externally associated with said first tubular element to fill at least partially a corresponding series of troughs on the radially exterior surface alternately shaped by said outer crests,
   wherein the lightweight polymeric material partially fills the series of troughs to define a corresponding series of hollow chambers of annular shape at radially inward bottoms of the series of troughs;
   wherein the second tubular element has a cell structure having different characteristics in relation to different areas of the flexible hose;
   wherein the outer crests of the first tubular element have respective troughs aligned to define a groove longitudinal to the first tubular element;
   a reinforcing thread element housed in the groove, predisposed to be embedded in the lightweight polymeric material of the second tubular element.

2. The flexible hose according to claim 1, wherein said outer crests of said first tubular element have a scalene triangle profile.

3. The flexible hose according to claim 1, wherein said chambers of annular shape are formed by sealing between said first tubular element and said second tubular element.

4. The flexible hose according to claim 1, wherein said second tubular element is externally connected with said first tubular element by coextrusion.

5. The flexible hose according to claim 1, wherein said outer crests of said first tubular element have, in an extended configuration, a pitch of a length of an order of one-third of an internal diameter of the first tubular element.

6. The flexible hose according to claim 1, and further comprising an external coating layer overlapped to said second tubular element.

7. A method for manufacturing a flexible hose, comprising the steps of:
  providing:
    a first tubular element of rigid polymeric material having corrugated shape and having in longitudinal cross-section a series of outer crests having a triangular profile, to be axially flexible, the first tubular element including a radially exterior surface and a radially interior surface, the radially interior surface defining a flow path for fluid through the flexible hose,
    a second tubular element of lightweight polymeric material externally associated with said first tubular element to fill at least partially a corresponding series of troughs on the radially exterior surface alternately shaped by said outer crests,
    wherein the lightweight polymeric material partially fills the series of troughs to define a corresponding series of hollow chambers of annular shape at radially inward bottoms of the series of troughs;
  that the second tubular element has a cell structure having different characteristics in relation to different areas of the flexible hose;
  that the outer crests of the said first tubular element have respective troughs aligned to define a groove longitudinal to the first tubular element;
  a reinforcing thread element housed in the groove, predisposed to be embedded in the lightweight polymeric material of the second tubular element;
  a. forming, by an extrusion device and a subsequent corrugation device, the first tubular element;
  b. arranging, by a compacting device, said first tubular element in a compacted configuration;
  c. associating externally with said compacted first tubular element, by a coextrusion device, the second tubular element of lightweight polymeric material so as to fill at least partially the corresponding series of troughs alternately shaped by said outer crests;
  d. cooling the hose obtained by said step of co-extrusion;
  e. operating a drawing of said hose at one end thereof to obtain a calibrated release of said compacted first tubular element.

8. The method according to claim 7, and further comprising performing the coextrusion of said second tubular element on said compacted first tubular element in an absence of air.

9. The method according to claim 7, and further comprising operating steps a-e in sequence with aid of a calibrated rod longitudinally inserted inside said first tubular element.

* * * * *